Figure 1:
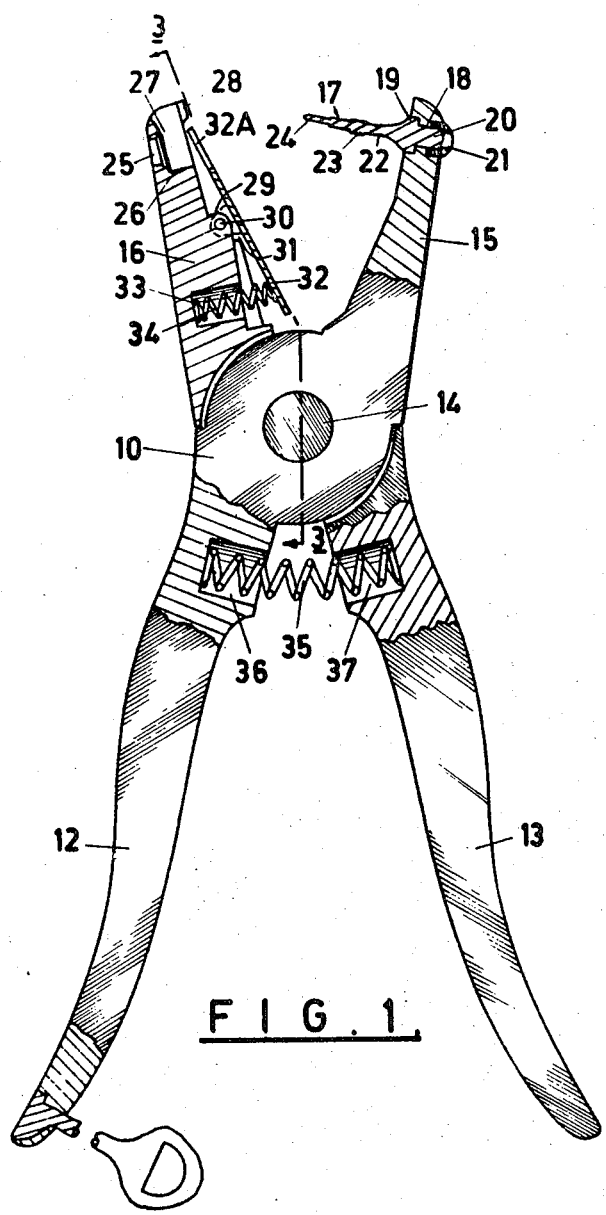

United States Patent [19]

Murphy et al.

[11] 3,812,859
[45] May 28, 1974

[54] ANIMAL EAR TAG APPLICATORS

[75] Inventors: Brian Egmont Murphy, Kaponga; John Reginald Burford; Alexander Wassilieff, both of Palmerston, all of New Zealand

[73] Assignee: Delta Plastics Limited, Palmerston, North, New Zealand

[22] Filed: Nov. 20, 1972

[21] Appl. No.: 307,964

[30] Foreign Application Priority Data
May 25, 1972 New Zealand...................... 167280

[52] U.S. Cl................................. 128/330, 72/409
[51] Int. Cl............................................ A61b 17/00
[58] Field of Search........ 40/300, 301, 302; 72/409; 128/329, 330

[56] References Cited
UNITED STATES PATENTS
| | | | |
|---|---|---|---|
| 3,184,874 | 5/1965 | Schofield............................. | 40/301 |
| 3,641,804 | 2/1972 | Oudenhoven.................... | 128/330 X |
| 3,731,414 | 5/1973 | Murphy et al....................... | 40/301 |

FOREIGN PATENTS OR APPLICATIONS
| | | | |
|---|---|---|---|
| 213,876 | 10/1909 | Germany............................ | 128/330 |
| 242,379 | 12/1962 | Australia............................. | 128/330 |

*Primary Examiner*—Channing L. Pace

[57] ABSTRACT

An animal ear tag application having two lever members pivoted together, one side of the levers at their pivot formed as handles and the other side formed as jaws, a pin fixed to the jaw of a first one of the lever members directed towards the jaw of a second one of the lever members and having an ear-piercing free end, the jaw of the second lever member formed with an open slot from its side facing the jaw of the first lever member and a hole passing through the jaw behind the open slot, an open-slotted plate centrally pivoted to the jaw of the second lever member and spring-loaded thereto, the slots being in line, and a spring arranged between the levers at their handle side of the pivot to normally move the jaws away from each other, the construction and arrangement being such that with a headed tubular male component of an ear tag mounted on the fixed pin of the jaw of the first lever member beyond the ear-piercing free end of the pin and a female component of the ear tag being located in the open slot of the jaw of the second lever member behind the plate of such jaw retained by the spring-loaded plate; on a closing of the jaws towards an animal's ear located between the jaws, the free end of the pin will pierce the animal's ear, then carrying the tubular male component through the female component and be secured thereby; upon release of handle pressure, the jaws will be opened by spring pressure and the pin withdrawn from the tag and the animal's ear.

3 Claims, 4 Drawing Figures

ANIMAL EAR TAG APPLICATORS

This invention relates to improvements in applicators designed for use in the attachment of tags to ears of animals.

It is known to provide such an applicator in the form of pliers wherein male and female components of an ear tag are each retained in position in a respective jaw of the pliers by retaining clips secured by a spring fitted around a pin attached to the pliers. Such a pliers was designed essentially to install a rigid type tag, or a tag having a rigid tab, to the animal's ear.

With the introduction of tags formed of a suitable resilient plastics material, the present invention is concerned with an applicator whereby such a tag may be installed to an animal's ear.

Accordingly the invention consists of an animal ear tag applicator having two lever members pivoted together, one side of the levers at their pivot formed as handles and the other side formed as jaws, a pin fixed to the jaw of a first one of the lever members directed towards the jaw of a second one of the lever members and having an ear-piercing free end, the jaw of the second lever member formed with an open slot from its side facing the jaw of the first lever member and a hole passing through the jaw behind the open slot, an open-slotted plate centrally pivoted to the jaw of the second lever member and spring-loaded thereto, the slots being in line, and a spring arranged between the levers at their handle side of the pivot to normally move the jaws away from each other, the construction and arrangement being such that with a headed tubular male component of an ear tag mounted on the fixed pin of the jaw of the first lever member beyond the ear-piercing free end of the pin and a female component of the ear tag being located in the open slot of the jaw of the second lever member behind the plate of such jaw retained by the spring-loaded plate; on a closing of the jaws towards an animal's ear located between the jaws, the free end of the pin will pierce the animal's ear, then carrying the tubular male component with it and then force the head of the tubular male component through the female component and be secured thereby; upon release of handle pressure, the jaws will be opened by spring pressure and the pin withdrawn from the tag and the animal's ear.

Figure 2:
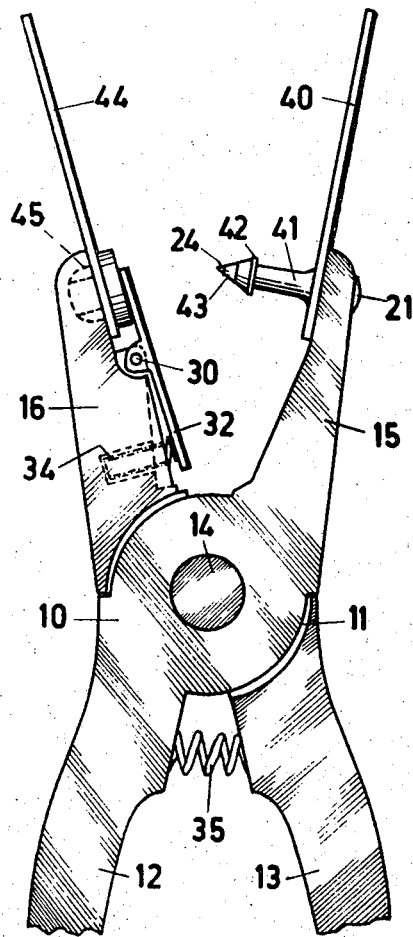
Figure 3:
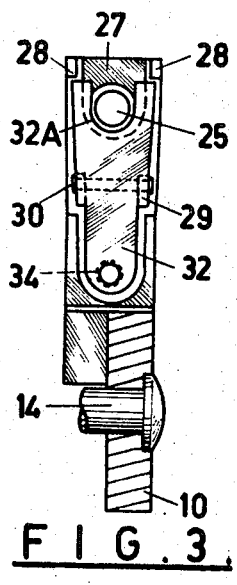
Figure 4:
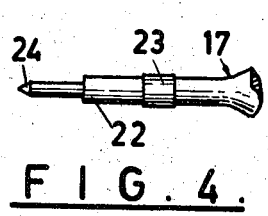

In further describing the invention, as a preferred embodiment, reference will be made hereinafter to the accompanying drawings, in which:

FIG. 1 is an elevation of the applicator, partly in cross-section, in its opened position, FIG. 2 is an elevation of a main part of the applicator in its opened position, with the ear tag components mounted on the respective jaws, FIG. 3 is a veiw taken on the line 3—3 in FIG. 1 and FIG. 4 is an elevation of a main part of the pin of the first jaw.

In giving effect to the invention, the applicator has its two lever members 10, 11 with their handles 12, 13 generally of a symmetrical shape about a centre line passing through the pivot 14. The jaws 15, 16 of the lever members 10, 11 when closed leave such a space between them as to receive the thickness of an ear of an animal such as a cow.

The jaw 15 of the first lever member 10 having the pin 17 fixed to it is of a lesser thickness than that of the jaw 16 of the second lever member 11. For the pin 17, the first jaw 15 has a hole 18 which is recessed at both sides. The pin 17 which is formed of high tensile strength tempered steel has a length so as to pass through an animal's ear and through the female component of the ear tag. This pin 17 in its length has a medially positioned boss 19 shaped to be fitted into the recess at the inner side of the first jaw 15. Beyond this boss 19 the pin 17 has a short stem to pass through the hole in the jaw and a screw-threaded end 20 upon which a dome slotted nut 21 is screwed, the nut fitting into the recess at the outer side of the first jaw 15.

Beyond its boss 19 the other side or shank 22 of the pin 17 is formed with a peripheral band 23 which locates and retains the male tubular component on the pin and beyond this band 23 the pin 17 is reduced in cross-section providing a shoulder and has a sharpened point 24.

The jaw 16 of the second lever member 13 has its hole 25 positioned so as to receive the pointed end 24 of the pin 17 of the first jaw 15 when closed onto an animal's ear. A radiused base 26 of the stepped open slot 27 is machined into this second jaw 16 to be concentric with or on the centre of the hole 25 in this jaw. The depth of stepped slot 27 is such as to take a back boss of the female component of the tag. Raised lugs 28 are located in line with and at the outer sides of the open slot 27.

The second jaw 16 has a boss 29 running across its inside face with a hole through this boss. A pin 30 passes through this hole and lugs 31 of the open slotted retainer plate 32 to form the pivot point therefor. At the inner end of the plate and towards the main pivot point 14 of the levers 10, 11 a small hole 33 is provided in from the inner face of the jaw 16 and acts as a seat for a small compression spring 34 inserted into the hole 33. The spring 34 causes an opposing end of the pivoted plate 32 having an open slot 32A to close down on any sized boss of the female component and which arrangement facilitates easy loading of the tag component by compressing the inner end of the pivoted plate 32 which in turn opens the opposing end.

For the spring 35 arranged between the lever members 10, 11 the handle side 12 or 13 of each lever member is formed with a recess 36, 37 just below the pivot 14 so as to house end portions of the spring 35 without any possibility of the spring becoming dislodged from a lever member when under natural extension of the spring.

This applicator has been especially designed for use with an ear tag comprising two components formed of a suitable resilient plastics material such as elastomeric material, a male and first component 40 having a hollow stem 41 with a flanged end 42 which has a spike 43 of rigid material shaped from its back end with a hole for the reception of the pin 17 of the jaw 15, and second componnet 44 having a boss 45 with a hole for fitting over the flanged end 42.

The first component 40 with its hard spike 43 is mounted on the fixed pin 17 of the first jaw 15 and retained from any rotational movement thereon by the band 23 sinking into the wall of the hollow stem 41 of the male component 40. The pointed end 24 of the pin 17 projects beyond the spike 43 of such male component. The second and female component 44 is retained in position by its back boss 45 located in the open-slot 27 in the second jaw 16 and the rest of its thickness accommodated by the space between the inner side of the second jaw 16 and the open-slotted plate 32 (see FIG. 2). The raised lugs 28, prevent the female component 44 from swiveling.

With the components 40, 44 mounted on the respective jaws 15, 16 of the applicator, the applicator is now positioned to receive an animal's ear. During a positive even closing of the jaws of the applicator, the pointed end 24 of the pin 17 initially pierces the animal's ear; the hard spike 43 of the male component 40 is punched through the ear. Where the shoulder of the pin 17 enters the hard spike 43, this, in turn, causes and draws the resilient hollow stem 41 with the enlarged and flanged end 42 through the hole of the second component 44. This engages and latches into the undercut seat of such hole. This stops the flexible coupled components 40, 44 dis-engaging or swiveling on the pin.

By the method of passing the rigid pin 17 of the first jaw 15 through the hollow stem 41, the end 24 of the pin contacts the reduced end of the rigid spike 43. The pin provides a continuous line of rigid material with sufficient strength to support and allow the first component's resilient stem 41 to be passed through the ear of the animal. On completion of the application, manual pressure is released on the handles of the pivoted lever members 12, 13, and under action of the strong compression spring 35, the jaws 15, 16 move apart causing the fixed pin 17 to be withdrawn from the hollow stem 41 of the ear tag which now remains as a resilient tag at the front and back of the ear.

It will of course be appreciated that whilst an applicator of single pin has been described above, it is open to modification so as to include a second or multiple pin with the second jaw including a further or multiple structure to the single structure as described above.

What is claimed is:

1. An animal ear tag applicator comprising two lever members pivoted together, handles formed at one side of the lever members, a spring set in compression between the one side of the levers, jaws formed at the other side of the lever members, a pin affixed to one lever member's jaw directed to the other lever member's jaw and having an ear-piercing free end, a recess formed in the other lever member's jaw facing the pin for receiving a female component of an ear tag, a hole formed in the other lever member's jaw behind the said recess for receiving a head of a tubular male ear tag component, a plate hinged centrally to the other lever member's jaw formed with a slot open towards an outer end, and a spring set in compression between an inner end of the said hinged plate and the other lever member's jaw.

2. A animal ear tag applicator as claimed in claim 1 and further comprising, a peripheral headed tubular male ear-tag component rotation-prevention band provided on the pin, a drive shoulder for the male component located on the pin and an ear-piercing point located at the free end of the pin.

3. An animal ear tag applicator as claimed in claim 2, wherein a base of the slot in the hinged plate is concentric with the recess and the hole in the other lever member jaw.

* * * * *